(12) United States Patent
Hermann et al.

(10) Patent No.: US 12,517,093 B2
(45) Date of Patent: Jan. 6, 2026

(54) FILTER MONITORING USING DIFFERENTIAL ACOUSTIC ATTENUATION

(71) Applicant: Carrier Corporation, Palm Beach Gardens, FL (US)

(72) Inventors: Theodore Hermann, Eden Prairie, MN (US); Bryan Yarde, Ft. Wayne, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 854 days.

(21) Appl. No.: 17/717,451

(22) Filed: Apr. 11, 2022

(65) Prior Publication Data

US 2022/0334085 A1     Oct. 20, 2022

Related U.S. Application Data

(60) Provisional application No. 63/174,785, filed on Apr. 14, 2021.

(51) Int. Cl.
*G01N 29/11*     (2006.01)
*B01D 46/00*     (2022.01)
(Continued)

(52) U.S. Cl.
CPC ......... *G01N 29/11* (2013.01); *B01D 46/0086* (2013.01); *B01D 46/46* (2013.01);
(Continued)

(58) Field of Classification Search
CPC ............. G01N 29/11; G01N 2291/105; G01N 2291/2698; G01N 29/07; B01D 46/0086;
(Continued)

(56) References Cited

U.S. PATENT DOCUMENTS

| 4,807,466 A | 2/1989 | Boscher et al. |
| 6,964,694 B2 | 11/2005 | Rauchfuss et al. |

(Continued)

FOREIGN PATENT DOCUMENTS

| DE | 19850225 A1 | 5/2000 |
| DE | 102005051925 A1 | 5/2007 |

(Continued)

OTHER PUBLICATIONS

European Search Report for Application No. 22164532.8; Issued Jul. 28, 2023; 4 Pages.

*Primary Examiner* — Stephen D Meier
*Assistant Examiner* — Quang X Nguyen
(74) *Attorney, Agent, or Firm* — CANTOR COLBURN LLP

(57) ABSTRACT

An acoustic monitoring system for detecting a condition of an air filter, the acoustic monitoring system including: a first acoustic transducer upstream with respect to airflow over the air filter; a second acoustic transducer upstream with respect to airflow over the air filter; a third acoustic transducer downstream with respect to airflow over the air filter; a fourth acoustic transducer downstream with respect to airflow over the air filter; a control unit in communication with the first acoustic transducer, the second acoustic transducer, the third acoustic transducer and the fourth acoustic transducer; the control unit configured to determine a filter attenuation value in response to one or more SPL values measured by at least one of the first acoustic transducer, the second acoustic transducer, the third acoustic transducer and the fourth acoustic transducer.

12 Claims, 4 Drawing Sheets

(51) Int. Cl.
*B01D 46/46* (2006.01)
*H04R 1/40* (2006.01)
*H04R 3/00* (2006.01)

(52) U.S. Cl.
CPC ............ *H04R 1/406* (2013.01); *H04R 3/005* (2013.01); *G01N 2291/105* (2013.01); *G01N 2291/2698* (2013.01); *H04R 2201/401* (2013.01)

(58) Field of Classification Search
CPC ... H04R 1/406; H04R 3/005; H04R 2201/401
See application file for complete search history.

(56) References Cited

U.S. PATENT DOCUMENTS

| | | |
|---|---|---|
| 7,395,710 B2 | 7/2008 | Daoud |
| 2003/0183085 A1 | 10/2003 | Alexander |
| 2004/0031386 A1* | 2/2004 | Rauchfuss ........... G01N 29/326 96/417 |
| 2005/0247131 A1 | 11/2005 | Breuer |
| 2007/0199378 A1 | 8/2007 | Daoud |
| 2023/0240494 A1* | 8/2023 | Sjöberg ................. B01D 50/20 95/19 |

FOREIGN PATENT DOCUMENTS

| | | |
|---|---|---|
| DE | 102007024997 A1 | 12/2008 |
| DE | 102009047614 A1 | 6/2011 |
| DE | 102010048208 A1 | 4/2012 |
| EP | 0580038 A2 | 1/1994 |
| EP | 0623376 A1 | 11/1994 |
| EP | 0908212 A1 | 4/1999 |
| WO | 9916538 A1 | 4/1999 |
| WO | 2019201700 A1 | 10/2019 |

* cited by examiner

FILTER MONITORING USING DIFFERENTIAL ACOUSTIC ATTENUATION

CROSS-REFERENCE TO RELATED APPLICATIONS

This application claims the benefit of Provisional Application No. 63/174,785 filed Apr. 14, 2021, the disclosure of which is incorporated herein by reference in its entirety.

BACKGROUND

The embodiments disclosed herein relate to air filter monitoring, and more particularly to air filter monitoring using differential acoustic attenuation.

The ability to maintain healthy environments in working and living spaces depends largely on the quality of air filtration. Filters may be either consumable or reusable and need to be changed/cleaned periodically to ensure optimal air quality and adequate system airflow. The drawback to many systems is that they rely on hours of operation (a timer) to signal a filter change. This results in suboptimal maintenance and system efficiency as the actual filter status is dependent on the cleanliness of the operating environment as much or more so than the hours of use.

Ideally, filter monitoring is implemented by measuring cleanliness of the filter directly, or by measuring a physical parameter that is more closely correlated to the cleanliness of the filter itself. One methodology that has been employed for filter measurement is based on the correlation between filter cleanliness and air resistance. As filter cleanliness decreases, the air resistance increases and results in higher differential pressure across the filter. Since differential pressure varies significantly depending on airspeed, satisfactory accuracy with this approach requires that the blower be operating, and an additional sensor be used to measure system airspeed. Manometers (differential pressure sensors) are also subject to measurement variation due to temperature/humidity changes, so temperature compensation using an additional thermal sensor is needed for accuracy. For these reasons, implementing a differential pressure technique for filter status can add complexity and cost to the air management system.

SUMMARY

According to an embodiment, an acoustic monitoring system for detecting a condition of an air filter, the acoustic monitoring system including: a first acoustic transducer upstream with respect to airflow over the air filter; a second acoustic transducer upstream with respect to airflow over the air filter; a third acoustic transducer downstream with respect to airflow over the air filter; a fourth acoustic transducer downstream with respect to airflow over the air filter; a control unit in communication with the first acoustic transducer, the second acoustic transducer, the third acoustic transducer and the fourth acoustic transducer; the control unit configured to determine a filter attenuation value in response to one or more SPL values measured by at least one of the first acoustic transducer, the second acoustic transducer, the third acoustic transducer and the fourth acoustic transducer.

In addition to one or more of the features described herein, or as an alternative, further embodiments may include wherein the one or more SPL values includes a cross-filter SPL value.

In addition to one or more of the features described herein, or as an alternative, further embodiments may include wherein the one or more SPL values includes a first direction cross-filter SPL value (c1) and a second direction cross-filter SPL value (c2).

In addition to one or more of the features described herein, or as an alternative, further embodiments may include wherein the first direction is opposite the second direction.

In addition to one or more of the features described herein, or as an alternative, further embodiments may include wherein the one or more SPL values includes an upstream SPL value (u) in response to attenuation between the first transducer and the second transducer.

In addition to one or more of the features described herein, or as an alternative, further embodiments may include wherein the one or more SPL values includes a downstream SPL value (d) in response to attenuation between the first transducer and the second transducer.

In addition to one or more of the features described herein, or as an alternative, further embodiments may include wherein the filter attenuation value is determined as: Rfilter=[(u-c1)+(d-c2)]/2.

In addition to one or more of the features described herein, or as an alternative, further embodiments may include wherein the control unit is configured to determine a presence or absence of the air filter by comparing the filter attenuation value to a first threshold.

In addition to one or more of the features described herein, or as an alternative, further embodiments may include wherein the first threshold varies in response to a type of filter media in the air filter.

In addition to one or more of the features described herein, or as an alternative, further embodiments may include wherein the control unit is configured to determine the condition of the air filter by comparing the filter attenuation value to a second threshold.

In addition to one or more of the features described herein, or as an alternative, further embodiments may include wherein the second threshold varies in response to a type of filter media in the air filter.

According to another embodiment, a method for detecting a condition of an air filter, includes placing a first acoustic transducer upstream with respect to airflow over the air filter; placing a second acoustic transducer upstream with respect to airflow over the air filter; placing a third acoustic transducer downstream with respect to airflow over the air filter; placing a fourth acoustic transducer downstream with respect to airflow over the air filter; determining a filter attenuation value in response to one or more SPL values measured by at least one of the first acoustic transducer, the second acoustic transducer, the third acoustic transducer and the fourth acoustic transducer.

In addition to one or more of the features described herein, or as an alternative, further embodiments may include wherein the one or more SPL values includes a cross-filter SPL value.

In addition to one or more of the features described herein, or as an alternative, further embodiments may include wherein the one or more SPL values includes a first direction cross-filter SPL value (c1) and a second direction cross-filter SPL value (c2).

In addition to one or more of the features described herein, or as an alternative, further embodiments may include wherein the first direction is opposite the second direction.

In addition to one or more of the features described herein, or as an alternative, further embodiments may include wherein the one or more SPL values includes an upstream SPL value (u) in response to attenuation between the first transducer and the second transducer.

In addition to one or more of the features described herein, or as an alternative, further embodiments may include wherein the one or more SPL values includes downstream SPL value (d) in response to attenuation between the first transducer and the second transducer.

In addition to one or more of the features described herein, or as an alternative, further embodiments may include wherein the filter attenuation value is determined as: Rfilter=[(u−c1)+(d−c2)]/2.

In addition to one or more of the features described herein, or as an alternative, further embodiments may include determining a presence or absence of the air filter by comparing the filter attenuation value to a first threshold.

In addition to one or more of the features described herein, or as an alternative, further embodiments may include wherein the first threshold varies in response to a type of filter media in the air filter.

In addition to one or more of the features described herein, or as an alternative, further embodiments may include wherein determining the condition of the air filter includes comparing the filter attenuation value to a second threshold.

In addition to one or more of the features described herein, or as an alternative, further embodiments may include wherein the second threshold varies in response to a type of filter media in the air filter.

Technical effects of embodiments of the present disclosure include the ability to detect air filter condition using a plurality of acoustic transducers.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
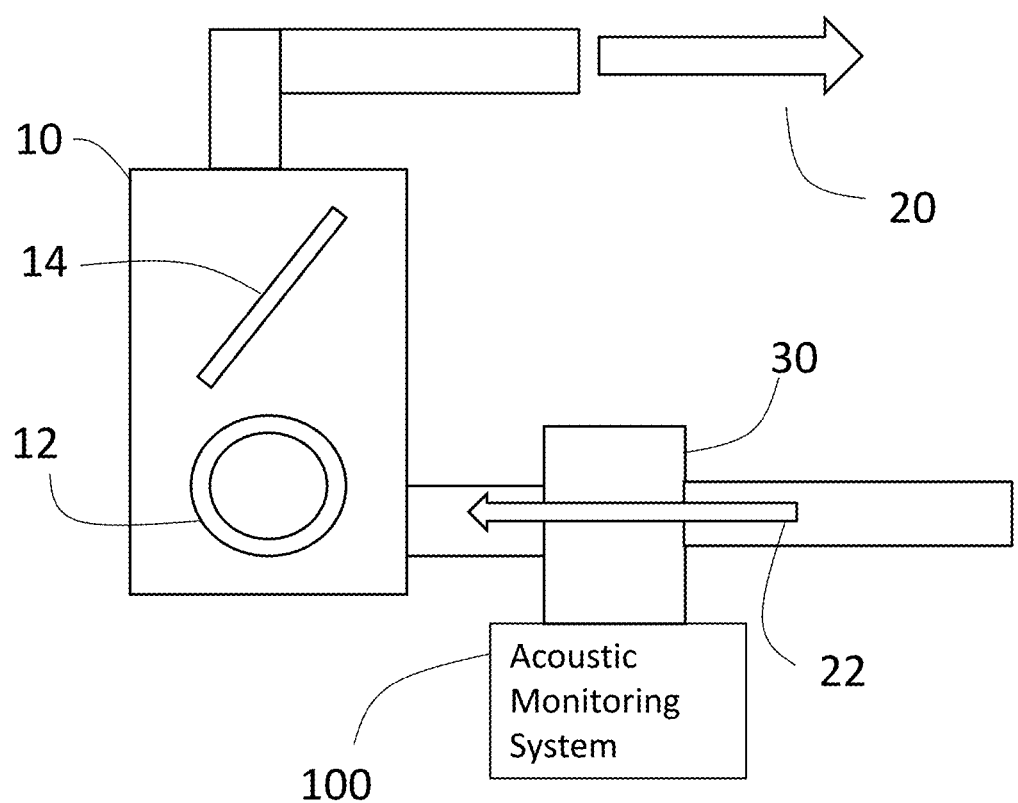
FIG. 1 depicts an air handler and air filter assembly in an example embodiment.

FIG. 1 depicts an example environment for implementing embodiments of the disclosure. An air handler 10 includes a blower 12 for generating an airflow over a heat exchanger 14. The air handler may be part of an HVAC system that provides heating and/or cooling. Return air 22 is provided to the blower 12, which is blown over the heat exchanger 14 and directed by a supply duct as supply air 20. The return air 22 flows through an air filter assembly 30. The air filter assembly 30 includes an air filter 32 (FIG. 3) that filters particulates (e.g., dust, pollen, fibers, etc.) from the return air 22 prior to the return air 22 being directed to an area to be conditioned. The air filter assembly 30 includes mechanical structure to support the air filter 32. An acoustic monitoring system 100 is in communication with the air filter assembly 30 and provides for detection of a condition of the air filter 32, as described in further detail herein.

Figure 2:
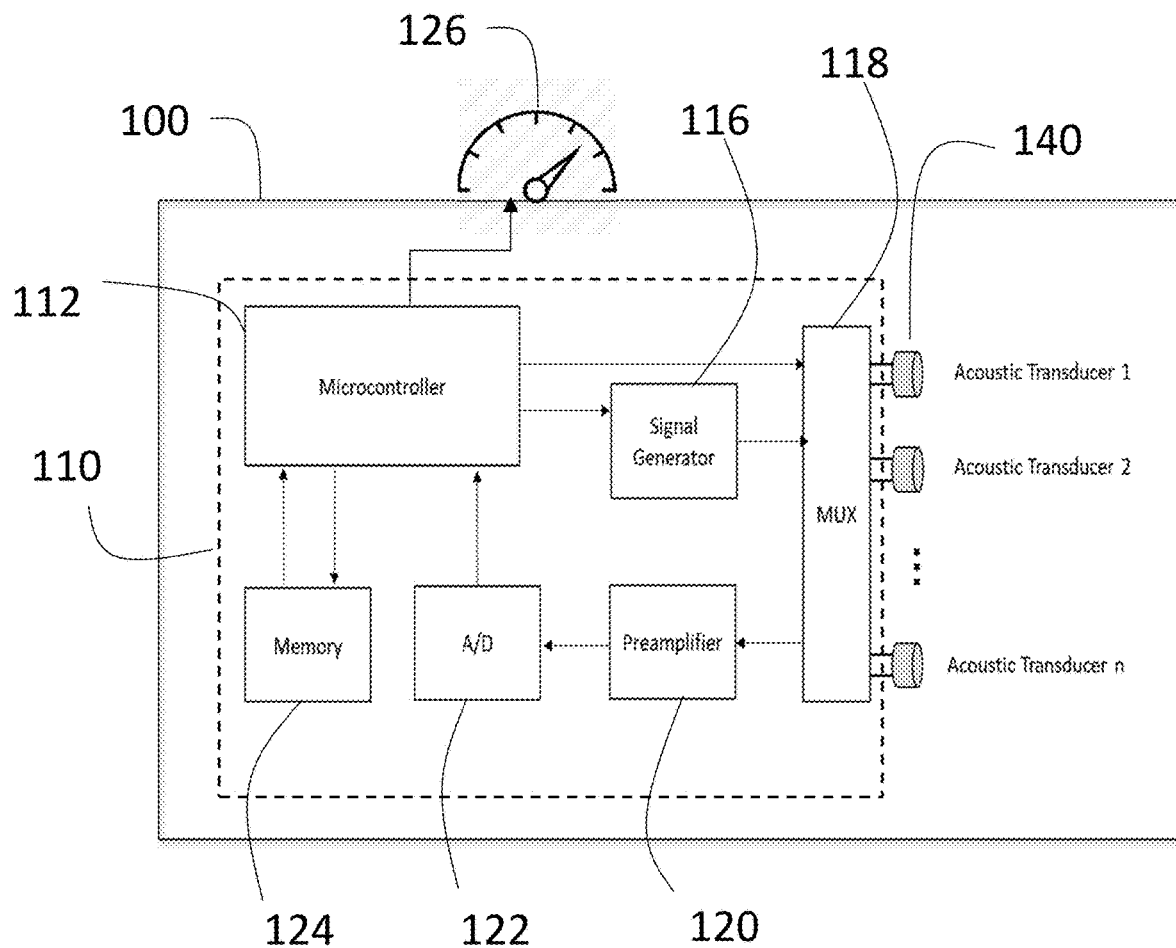
FIG. 2 depicts an acoustic monitoring system in an example embodiment.

FIG. 2 depicts the acoustic monitoring system 100 in an example embodiment. The acoustic monitoring system 100 includes a control unit 110 and a plurality of acoustic transducers 140. The acoustic transducers 140 may operate as transmitters and/or receivers. As used herein, a transducer may be a transmitter only, a receiver only, or a transmitter/receiver. The acoustic transducers 140 may be implemented using one or more of a piezoelectric device, MEMs microphone, or similar technology. One advantage of a piezoelectric transducer is that it can be operated as either a transmitter or receiver allowing multidirectional testing of the system. Hydrophobic coatings can be applied to the acoustic transducers 140 as a dust deterrent to minimize build up on the acoustic transducers 140 embedded in the airflow.

The control unit 110 includes a controller 112 which may be implemented using known devices, such as a field programmable gate array (FPGA), central processing unit (CPU), application specific integrated circuits (ASIC), etc. A signal generator 116 is used to generate test signals to be emitted by one or more of the transducers 140. A multiplexer 118 directs signals to and from the various transducers 140. A preamplifier 120 receives an analog output signal from one or more of the transducers 140 and increases the amplitude of the analog output signal. An analog-to-digital converter 122 converts the output signal from the preamplifier 120 into a digital format usable by the controller 112. A memory 124 is coupled to, or integrated within, the controller 112 and provides for storage of calibration data, measured data, air filter characteristics, executable programs, alarm limits, etc. An indicator 126 is coupled to the controller 112 and may be used to indicate that an air filter 32 needs to be changed. The indicator 126 may be a visual indicator, audible indicator or a combination thereof.

Figure 3:
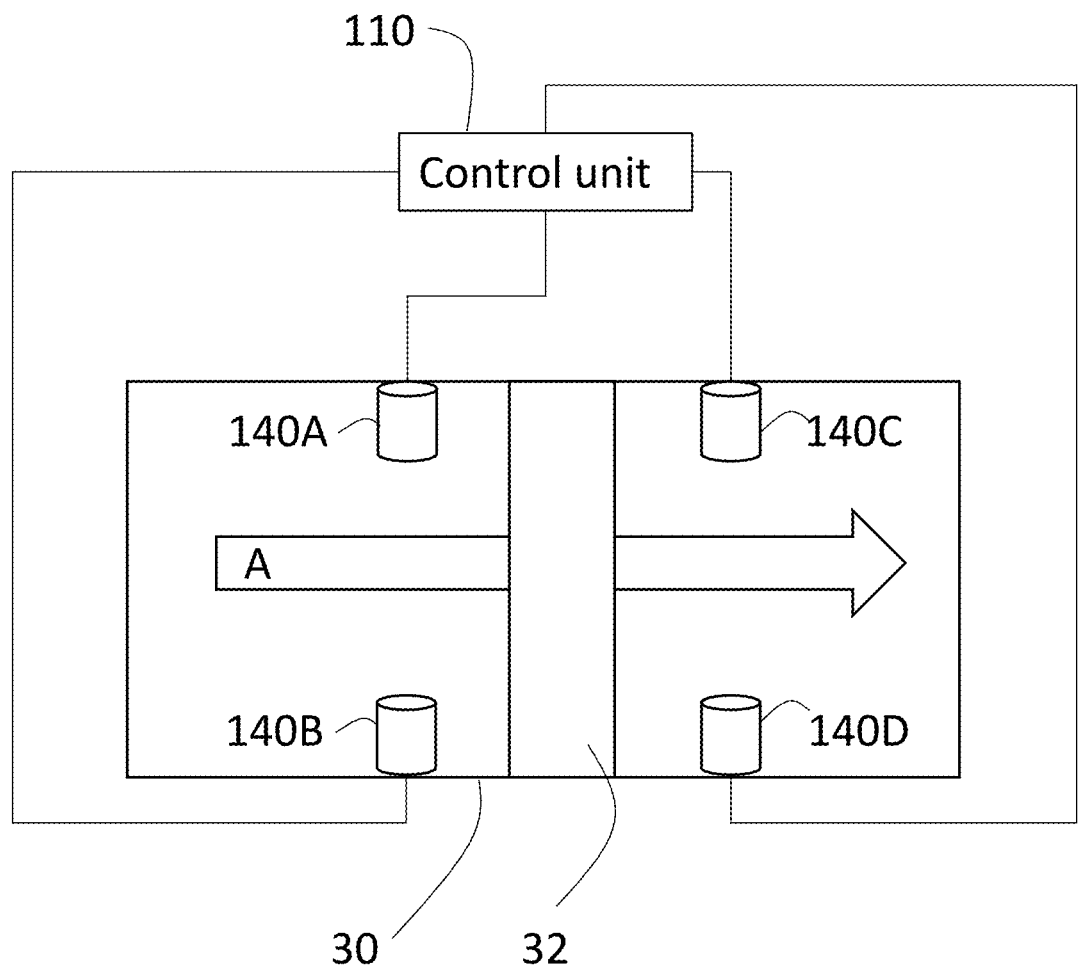
FIG. 3 depicts an acoustic monitoring system and air filter assembly in an example embodiment.

FIG. 3 depicts the acoustic monitoring system 100 and air filter assembly 30 in an example embodiment. Transducers 140 are located both upstream and downstream of the air filter 32 with respect to airflow, A, across the air filter 32. As shown in FIG. 3, a first transducer 140A and a second transducer 140B are located upstream of air filter 32. A third transducer 140C and a fourth transducer 140D are located downstream of air filter 32. The arrangement of transducers 140A-140D allows the acoustic monitoring system 100 to compensate for degradation of the transducers 140A-140D due to accumulation of particulates (e.g., dust) on one or more of transducers or other factors, such as decreased transducer efficiency over time.

Figure 4:
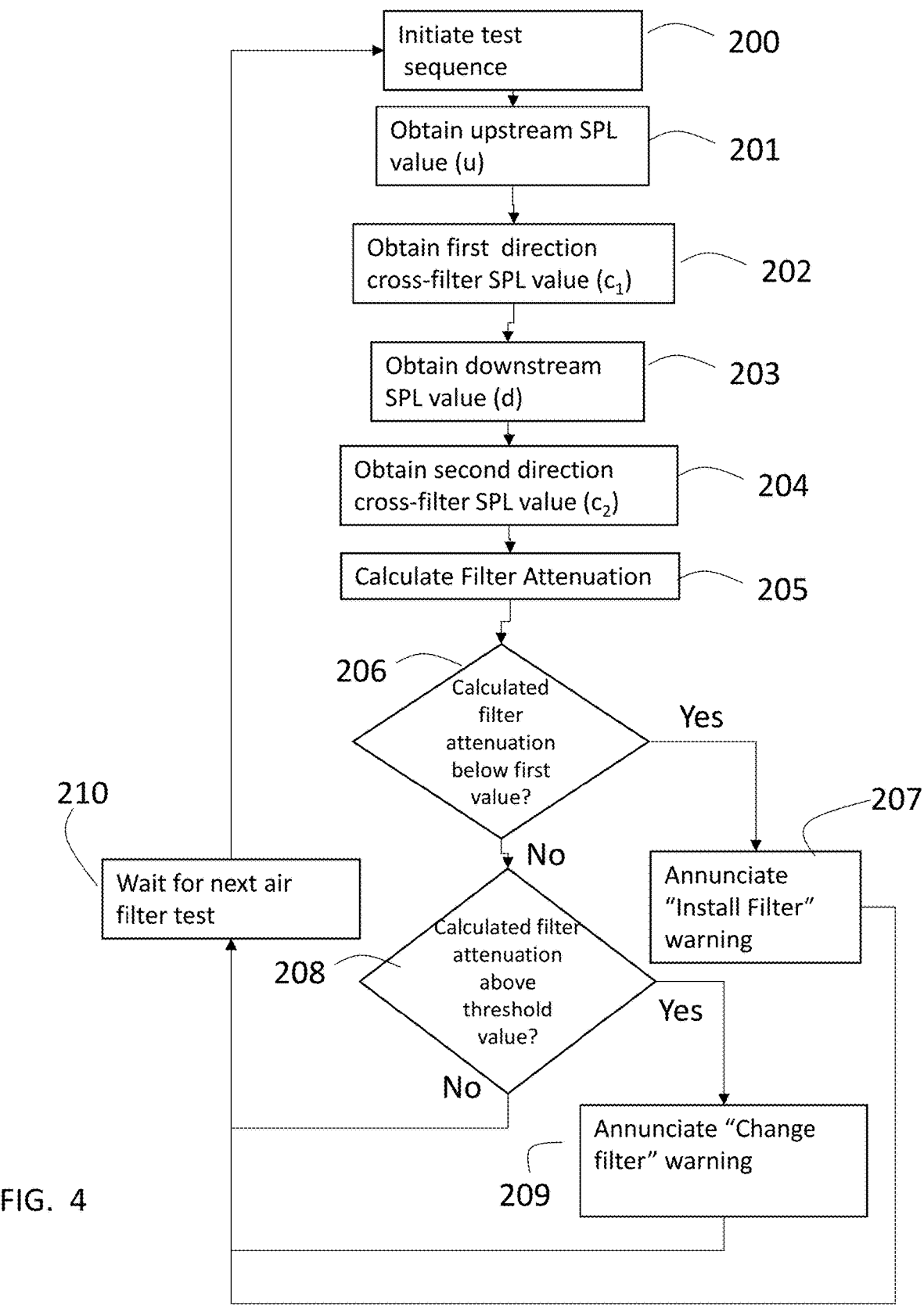
FIG. 4 depicts a flowchart of a process for determining a condition of an air filter in an example embodiment.

FIG. 4 depicts a flowchart of a process for determining a condition of an air filter 32 in an example embodiment. The process begins at 200, where a periodic filter test is initiated based on a selectable interval controlled by the controller 112.

At 201, an upstream measurement value is obtained by generating an acoustic test signal from transducer 140A. The value of the acoustic signal is controlled by the controller 112 and the signal generator 116. Transducer 140B receives the sound pressure level (SPL) from the first acoustic test signal and stores this value in memory as the upstream SPL value (u). In many cases, the attenuation of the upstream value will be small, but can be significant due to accumulation of dust and dirt on transducers 140A and 140B. The upstream SPL value can also vary based on environmental conditions (humidity, temperature, etc.).

At 202, a first direction (upstream-downstream) cross-filter SPL value is obtained by measuring the same acoustic test signal from transducer 140A as generated in 201. Transducer 140D receives the acoustic test signal and generates an output signal representing the magnitude of the received acoustic test signal and stores this value in memory as the first direction cross-filter SPL value (c1). The first direction may be downstream, i.e., across the air filter 32 in the same direction as air flow, A.

At 203, a downstream SPL value is obtained by sending an acoustic test signal from transducer 140C. The value of the acoustic test signal is controlled by the controller 112 and the signal generator 116. Transducer 140D receives the acoustic test signal and generates an output signal representing the magnitude of the received acoustic test signal and stores this value in memory as the downstream SPL value (d). In many cases, the downstream baseline attenuation value will be small, but can be significant due to accumulation of dust and dirt on transducers 140C and 140D. The downstream SPL value can also vary based on environmental conditions (humidity, temperature, etc.).

At 204, a second direction (downstream-upstream) cross-filter attenuation test is initiated. The second cross-filter value is obtained by measuring the same acoustic test signal from transducer 140C as generated in 203. Transducer 140B receives the acoustic test signal and generates an output signal representing magnitude of the received acoustic test signal and stores this value in memory as the second direction cross-filter SPL value (c2). The second direction may be upstream, i.e., across the air filter 32 in the opposite direction as air flow, A.

At 205, a filter attenuation value is calculated using the stored values captured in the previous steps using the following formula: $Rfilter=[(u-c1)+(d-c2)]/2$. The averaging of the relative cross-filter and common side measurements accounts for variation due to environmental conditions (humidity, temperature, etc.), as well as the asymmetric accumulation of dust and dirt buildup on upstream and downstream sides of the filter.

At 206 the calculated filter attenuation value is compared with a stored first threshold value that represents the value of a clean, installed filter of similar composition and type. If the calculated value is below the minimum level, then the control moves to 207 where an "Install Filter" message can be annunciated to indicate that the system does not detect the presence of a filter. The "Install Filter" warning will clear when a value above the stored minimum value is detected. If the calculated filter attenuation value is higher than the stored minimum threshold value, then the control moves to 208.

At 208 the calculated filter attenuation value is compared with a stored second threshold value that represents the value of an installed filter of similar composition and type that has reached the recommend lifetime based on the attenuation value. If the calculated value is above second threshold, then the control moves to 209 where a "Replace Filter" message can be annunciated to indicate that the system filter should be exchanged for a new unit to maintain proper operating efficiency. The "Replace Filter" warning will clear when a value above the second threshold value is detected. The second threshold is greater than the first threshold.

The first threshold used at 206 and the second threshold used in 208 may vary based on the type of air filter 32 installed. The user may enter the type of air filter 32 (e.g., model number, filter media, thickness) through a user interface on control unit 100, or through a QR code on the filter via a mobile phone application. The type of air filter 32 may be used to establish condition thresholds in the control unit 110.

In 210 the next filter test is scheduled to initiate on a periodic basis based on a timed interval controlled by the controller 112 that can a variable, selectable setting (e.g. once every 24 hour period).

The process of FIG. 4 be initiated periodically (e.g., daily, weekly, monthly) under control of the control unit 110. The controller 112 may confirm that certain operational conditions are met (e.g., blower 12 is off or has been off for a period of time). The cross-filter attenuation test may also be initiated manually, by a user interacting with the control unit 110 (e.g., pressing a test button or some other user interface).

Transducers 140A-140D may operate at various frequencies, including ultrasonic frequencies. The test acoustic signal may have a frequency adjusted based on the type of filter media used in air filter 32, or use multiple signal amplitudes to calculate a filter attenuation value. The thresholds used at 206 and 208 to determine the presence and condition of the air filter 32 may vary based on the type of filter media used in air filter 32. The type of filter media used in the air filter 32 may be entered via user interface at the control unit 110. The control unit 110 may also detect the type of filter media used in the air filter 32 by reading indicia on the air filter 32 (e.g., a bar code). The controller 112 may also detect when the air filter 32 is removed (e.g., based on a significant drop in cross-filter attenuation value) and restart the entire process of FIG. 4.

Embodiments described herein provide several advantages. The system provides a measurement of filter condition that is adjusted by cleanliness of the transducers. The system does not require system airflow via the blower 12 to measure the condition of the air filter 32. The transducers 14A-140D are less complex than differential pressure sensors (e.g., manometers). The system provides intrinsic temperature compensation and common mode noise rejection (e.g., due to dirt). Thresholds may adjust based on the filter media type and frequency of testing. The system provides for easier implementation of ingress protection (e.g., IP66/7 requirements).

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed:

1. An acoustic monitoring system for detecting a condition of an air filter, the acoustic monitoring system comprising:
 a first acoustic transducer upstream with respect to airflow over the air filter;
 a second acoustic transducer upstream with respect to airflow over the air filter;
 a third acoustic transducer downstream with respect to airflow over the air filter;
 a fourth acoustic transducer downstream with respect to airflow over the air filter;
 a control unit in communication with the first acoustic transducer, the second acoustic transducer, the third acoustic transducer and the fourth acoustic transducer;
 wherein the control unit is configured to generate an acoustic test signal from at least one of the first acoustic transducer, the second acoustic transducer, the third acoustic transducer and the fourth acoustic transducer;
 wherein the control unit is configured to determine a filter attenuation value in response to one or more sound pressure level (SPL) values measured by at least one of the first acoustic transducer, the second acoustic transducer, the third acoustic transducer and the fourth acoustic transducer in response to the acoustic test signal;
 wherein the one or more SPL values includes a first direction cross-filter SPL value (c1) and a second direction cross-filter SPL value (c2);
 wherein the one or more SPL values includes an upstream SPL value (u) in response to attenuation between the first transducer and the second transducer;
 wherein the one or more SPL values includes a downstream SPL value (d) in response to attenuation between the third transducer and the fourth transducer;
 wherein the filter attenuation value is determined as:

$R_{filter} = [(u-c1)+(d-c2)]/2.$

2. The acoustic monitoring system of claim 1, wherein the first direction is opposite the second direction.

3. The acoustic monitoring system of claim 1, wherein the control unit is configured to determine a presence or absence of the air filter by comparing the filter attenuation value to a first threshold.

4. The acoustic monitoring system of claim 3, wherein the first threshold varies in response to a type of filter media in the air filter.

5. The acoustic monitoring system of claim 1, wherein the control unit is configured to determine the condition of the air filter by comparing the filter attenuation value to a second threshold.

6. The acoustic monitoring system of claim 5 wherein the second threshold varies in response to a type of filter media in the air filter.

7. A method for detecting a condition of an air filter, the method comprising:
 placing a first acoustic transducer upstream with respect to airflow over the air filter;
 placing a second acoustic transducer upstream with respect to airflow over the air filter;
 placing a third acoustic transducer downstream with respect to airflow over the air filter;
 placing a fourth acoustic transducer downstream with respect to airflow over the air filter;
 generating an acoustic test signal from at least one of the first acoustic transducer (140A), the second acoustic transducer (140B), the third acoustic transducer (140C) and the fourth acoustic transducer (140D);
 determining a filter attenuation value in response to one or more sound pressure level (SPL) values measured by at least one of the first acoustic transducer, the second acoustic transducer, the third acoustic transducer and the fourth acoustic transducer in response to the acoustic test signal;
 wherein the one or more SPL values includes a first direction cross-filter SPL value (c1) and a second direction cross-filter SPL value (c2);
 wherein the one or more SPL values includes an upstream SPL value (u) in response to attenuation between the first transducer and the second transducer;
 wherein the one or more SPL values includes a downstream SPL value (d) in response to attenuation between the third transducer and the fourth transducer;
 wherein the filter attenuation value is determined as:

$R_{filter} = [(u-c1)+(d-c2)]/2.$

8. The method of claim 7, wherein the first direction is opposite the second direction.

9. The method of claim 7, further comprising determining a presence or absence of the air filter by comparing the filter attenuation value to a first threshold.

10. The method of claim 9, wherein the first threshold varies in response to a type of filter media in the air filter.

11. The method of claim 7, wherein determining the condition of the air filter includes comparing the filter attenuation value to a second threshold.

12. The method of claim 11 wherein the second threshold varies in response to a type of filter media in the air filter.

* * * * *